July 30, 1963  R. GOTTSCHALD  3,099,469
SUSPENSION JOINT
Filed July 19, 1960
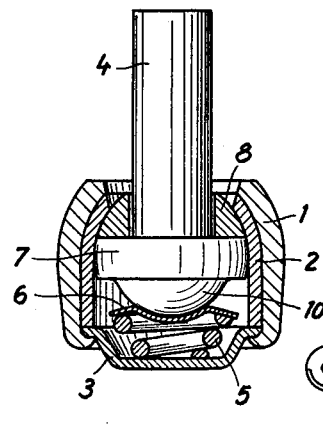
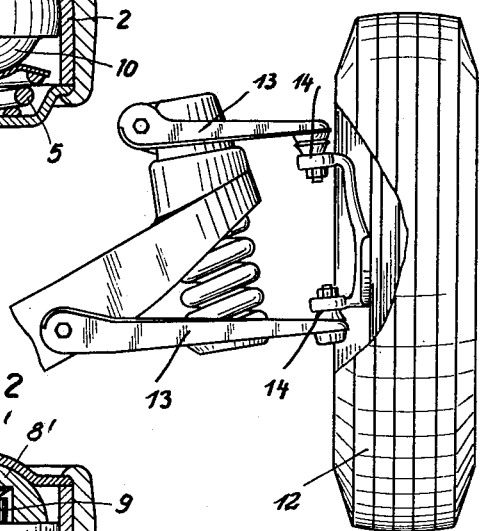
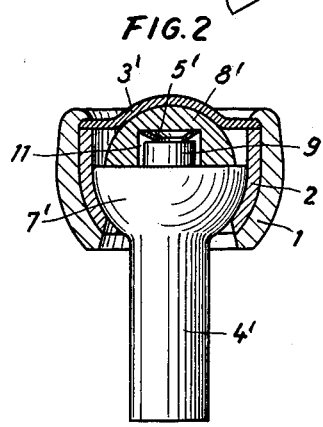
Inventor:—
Rudolf Gottschald,
By:— Dowson & Dowson,
His Attorneys.

3,099,469
SUSPENSION JOINT
Rudolf Gottschald, Osterrath, Germany, assignor to A. Ehrenreich & Co., Dusseldorf-Oberkassel, Germany, a company of Germany
Filed July 19, 1960, Ser. No. 43,935
Claims priority, application Germany July 22, 1959
5 Claims. (Cl. 287—90)

The invention relates to a universal joint such as a joint for the independent suspension of the steered wheels of a motor vehicle.

The invention consists in a universal joint which comprises in combination a shaft, a housing for one end of the shaft, a transverse bearing for the shaft on the inside surface of the housing, and a transverse bearing surface on the shaft in intimate contact with said transverse bearing, the transverse bearing surface of the shaft being in the shape of an annular section defined by two section planes which are parallel to a diametral plane of a spherical surface and lie on opposite sides of this plane.

A slide member for the shaft is generally held between the shaft and the housing.

The transverse bearing surface of the shaft is generally spherically convex and the diameter thereof is generally substantially identical to the diameter of a corresponding spherically concave transverse bearing in the housing. The housing is normally provided with retaining means which prevent an axial shift of the shaft in the housing under the effect of transverse or radial forces.

The shaft may be provided at said one end thereof with a collar the peripheral surface of which constitutes said transverse bearing surface. The slide member may then be constructed as a solid spherical cap the curved surface of which contacts a corresponding spherically concave face on the inside of the housing at a location around the opening through which the shaft enters the housing, and the base of which faces towards the collar. The slide member is axially bored to receive the shaft body, the walls of the axial bore being free of contact with the body of the shaft. The shaft may also have a spherically convex head, which has the same centre of curvature as the peripheral bearing surface of the collar but a smaller radius of curvature. This head may rest against the concave face of a dished axial bearing plate which is biased against the head of the shaft.

Alternatively, the slide member may be held between the shaft and a location on the shaft housing which is remote from the opening through which the shaft enters the housing. The slide member may be in the shape of a spherical cap the base of which is recessed so as freely to receive an extension which projects beyond the end face of the shaft. This extension is generally formed at the outer end of an enlarged shaft head the lateral surface of which constitutes the transverse bearing surface of the shaft. The recess in the base of the slide member generally contains a spring which is compressed between the extension and the slide member.

Reference is now made by way of example to the accompanying drawing in which:

FIGURE 1 is an axial section of a universal joint in accordance with the invention for carrying a load;

FIGURE 2 is an axial section of a universal joint in accordance with the invention for supporting a load; and FIGURE 3 illustrates a wheel suspended by means of a universal joint according to FIGURE 1 and a universal joint according to FIGURE 2.

Referring to FIGURE 1, the illustrated joint includes an annular housing 1, the inside of which is lined by a shell bearing 2. A shaft 4 extends from the housing at one end thereof and the other end of the housing is closed by means of a dished cap 3, the sidewalls of the housing being beaded over the cap. The shaft 4 is provided within the housing with an annular integral collar 7 and a head 10 in the form of a cap formed as a segment of a sphere the curved surface of which is directed towards the concave face of the cap 3. A dished axial bearing plate 6 is urged against the head 10 by a compression spring 5 held between the plate 6 and the cap 3.

The shaft 4 passes through a slide member 8 in the form of a section of a sphere which is axially bored to receive the shaft. The slide member 8 is held between the collar 7 and a spherically concave portion of the shell bearing 2 around the opening through which the shaft 4 extends. The diameter of the shaft is smaller than the internal diameter of the axial bore in the slide member 8 so as to allow the body of the shaft inwardly of the collar 7 to pass freely through the slide member.

The upper annular radial face of the collar 7 as viewed in FIG. 1 rests against the flat base of the slide member 8. The peripheral surface of the collar is spherically convex about a center point in the axis of the shaft obtained by two section planes which are both parallel to the diametral plane of a sectioned spherical surface and which lie on each side of this diametral plane. This peripheral surface which constitutes the transverse bearing surface of the shaft is in intimate contact with a spherically concave annular portion of the shell bearing 2, which constitutes a transverse bearing for the shaft. The portion of the inside surface of this transverse bearing which is in contact with the peripheral surface of the collar is of closely similar shape and dimensions.

The construction of the joint which has just been described ensures that forces which lie transversely to the axis of the shaft 4 are transmitted through the collar 7 and the bearing 2 to the housing whereas forces which lie in the direction of the axis of the shaft are taken up by the slide member 8 or the bearing plate 6. The head 10 and the lateral surface of the collar 7 have an identical centre of curvature but the head 10 has a smaller radius of curvature. The contacting faces of the collar 7 and the slide member 8 need not be plane as shown but may, for instance, each have a conical shape.

Referring to FIGURE 2, the shaft 4' may be considered as formed with an enlarged spherical head which is in the form of two semi-spherical sections 7' and 8' having flat abutting surfaces parallel to the diametral plane of a sectioned sphere. The convex lateral surface of the head 7' constitutes the transverse bearing surface of the shaft.

In this case, the slide member 8' is held between the cap 3' at the closed end of the housing and the head 7' of the shaft. The member 8' is in the shape of a semi-spherical cap of smaller radius than the head 7'. The base of the slide member 8' is recessed at 11 so as freely to receive a cylindrical extension 9 which projects from the substantially flat end face of the head 7'. In this case also, the contacting faces of the head 7' and the member 8' need not be plane. A central portion of the closure cap 3' is spherically concave to receive the convex face of the slide member 8'. The recess 11 is deeper than the length of the extension 9, and the internal diameter of the recess is larger than the diameter of the extension 9. A spring 5' within the recess 11 acts through the extension 9 upon the head 7'.

Referring to FIGURE 3, a steered wheel 12 is shown suspended from transverse steering rods 13 by means of a pair of universal joints 14. The upper joint 14 is constructed according to FIGURE 2 and the lower joint 14 is constructed according to FIGURE 1.

What I claim as my invention and desire to secure by Letters Patent of the United States is:

1. A supporting joint for independent suspension of vehicle wheels comprising a housing, a pivot pin extending from an opening in one end of the housing, said housing having an interior spherical surface adjacent said opening, said pivot pin having a convex spherical surface of the same diameter as said interior spherical surface, said convex spherical surface engaging said interior spherical surface when said pivot pin is untilted with respect to said housing, a flat surface on said pivot pin on at least one side of the equator of said convex spherical surface leaving clear the interior of the housing, a spherical segment having a flat surface slidable radially and rotatively on the flat surface of said pivot pin, said spherical segment also being tiltable within said housing as said pivot pin tilts.

2. A supporting joint for independent suspension of vehicle wheels comprising a housing, a pivot pin extending from an opening in one end of the housing, said housing having an interior spherical surface adjacent said opening, a collar integral with said pin having a spherical surface extending on both sides of the equator of the same and a flat surface facing the pivot pin opening of the housing, a spherical segment on one side of said collar having a flat surface slidable radially on the flat surface of the collar and also having a spherical surface of the same diameter as said interior spherical surface, a convex spherical surface on the opposite side of said collar, and a bearing element having a concave spherical surface yieldingly engaging said opposite convex surface to support the pin.

3. A joint as claimed in claim 2 wherein the center of curvature of said opposite convex surface on the pin is the same as the center of curvature of said spherical segment but the curvature of the latter is greater than that of the former.

4. A supporting joint for independent suspension of vehicle wheels comprising a housing, a pivot pin extending from an opening in one end of the housing, said housing having an interior spherical surface, said pivot pin having a head with a convex spheriacl surface of the same diameter as said interior spherical surface, said convex surface extending on both sides of the equator of the same, a flat surface on said head, a spherical segment having a convex spherical surface bearing against the interior spherical surface of the housing and also having a flat surface slidable over said flat surface of the head radially as well as rotatively with respect to the pin axis.

5. A supporting joint for independent suspension of vehicle wheels comprising a housing, a pivot pin extending from an opening in one end of the housing, said housing having an interior spherical surface and being open at one end for entrance of said pivot pin, said pivot pin having a head with a convex spherical surface bearing on the interior spherical surface of the housing, and also having a flat surface facing opposite the open end of the housing, a spherical segment engaging the spherical surface of the housing, said spherical segment having a flat surface slidable on the flat surface of the head, an extension from the flat surface of the head into a hole in the segment, said extension being smaller than the hole in all directions allowing for radial sliding movement of the segment with respect to the head, and resilient means between the extension and segment, the center of curvature of the spherical surface of the head being the same as the spherical segment but the radius of the latter being less than the former.

References Cited in the file of this patent
UNITED STATES PATENTS

| | | |
|---|---|---|
| 2,727,768 | Latzen | Dec. 20, 1955 |
| 2,733,087 | Latzen | Jan. 31, 1956 |
| 2,953,401 | Moskovitz et al. | Sept. 20, 1960 |

FOREIGN PATENTS

| | | |
|---|---|---|
| 465,265 | Canada | May 23, 1950 |